United States Patent [19]

Perkins

[11] 4,209,230
[45] Jun. 24, 1980

[54] REFLECTOR DEVICE FOR BICYCLES

[76] Inventor: John A. Perkins, 1905 Laurelwood, Kalamazoo, Mich. 49002

[21] Appl. No.: 921,446

[22] Filed: Jul. 3, 1978

Related U.S. Application Data

[63] Continuation-in-part of Ser. No. 905,999, May 15, 1978, abandoned.

[51] Int. Cl.² .............................................. G02B 5/12
[52] U.S. Cl. ........................................ 350/99; 116/46; 301/37 SA
[58] Field of Search ..................... 350/97–106; 301/37 SA; 250/462; 116/46, 28 R; 46/39; D34/15

[56] References Cited

U.S. PATENT DOCUMENTS

| | | | |
|---|---|---|---|
| 1,481,363 | 1/1924 | Hall | 301/37 SA |
| 2,158,902 | 5/1939 | Gray | 350/99 |
| 2,344,542 | 3/1944 | Fike | 301/37 SA |
| 2,752,816 | 7/1956 | Austing | 350/99 |
| 3,951,517 | 4/1976 | Levy et al. | 350/99 |
| 4,047,800 | 9/1977 | De Bease | 350/99 |
| 4,073,453 | 2/1978 | Thomas | 350/99 |

Primary Examiner—John K. Corbin
Assistant Examiner—B. W. de los Reyes
Attorney, Agent, or Firm—Gordon W. Hueschen

[57] ABSTRACT

A scanning disc having one or more scan-apertures is affixed to a bicycle opposite a wheel thereof and one or more reflectors is affixed to the wheel in position to be scanned by a scan-aperture so that, when the wheel is turning, the reflector is repeatedly scanned by the scan-aperture of the scanning disc.

34 Claims, 12 Drawing Figures

U.S. Patent  Jun. 24, 1980  4,209,230
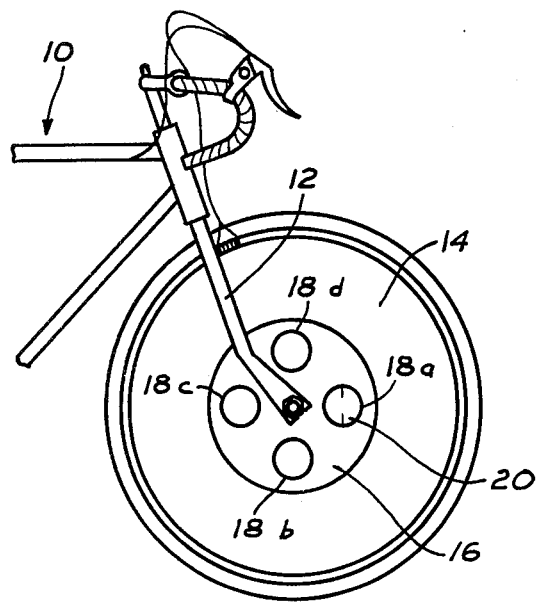
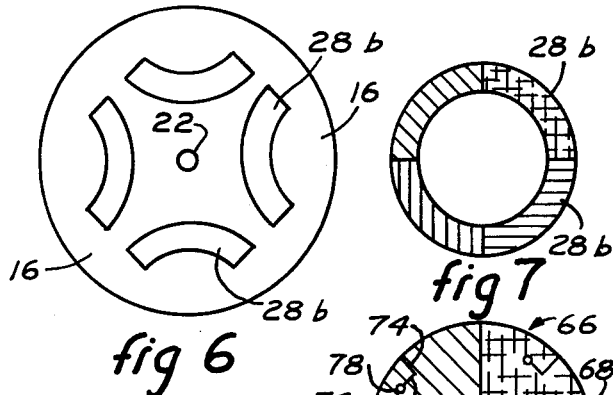
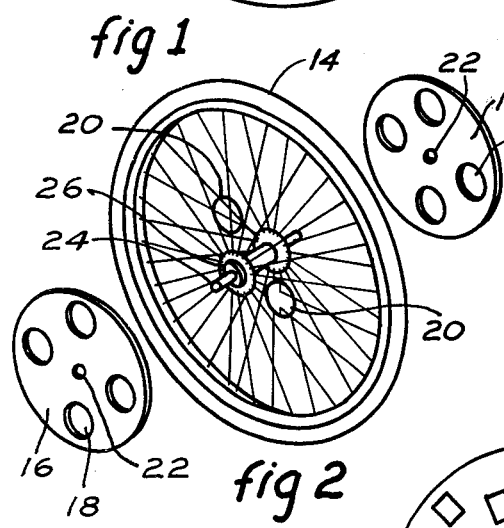
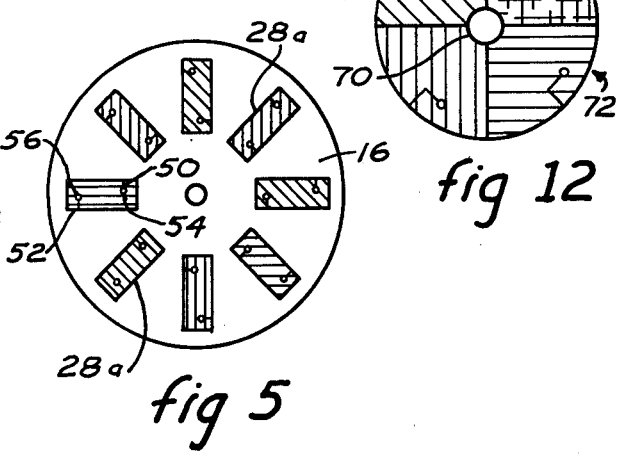
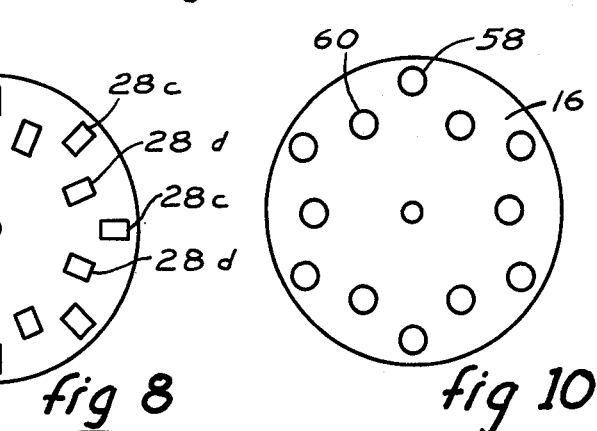
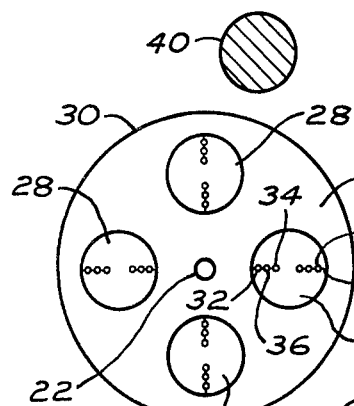
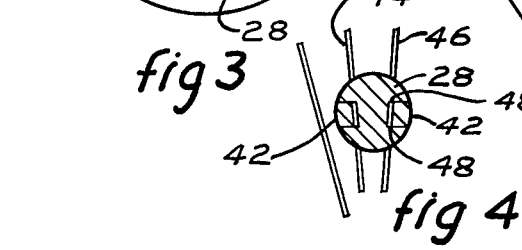
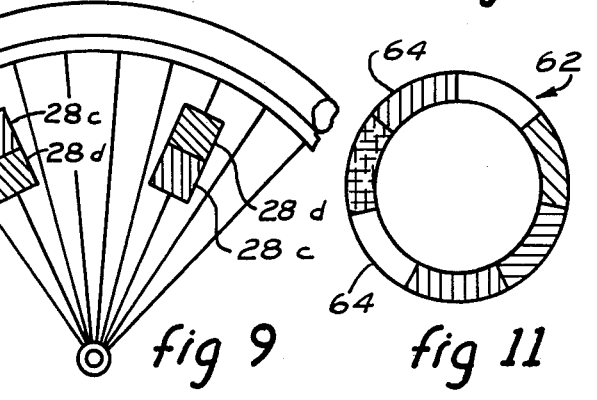

REFLECTOR DEVICE FOR BICYCLES

This is a continuation-in-part of application Ser. No. 905,999 filed May 15, 1978, now abandoned.

FIELD OF INVENTION

PRIOR ART

This invention relates to a reflector device for a wheeled vehicle, such as a bicycle, and to a wheeled vehicle having the reflector device mounted thereon.

It is common practice in this art to put reflectorized tape on a bicycle or reflecting discs on the wheels thereof in order that the bicycle will show up conspicuously in the headlights of a motor vehicle. This invention relates to improvements in such devices adapted to be applied to the wheel of a bicycle or like wheeled vehicle and to the vehicle with the device.

OBJECTS OF THE INVENTION

It is an object of the invention to provide an improved reflector device for wheeled vehicles. It is a further object of the invention to provide a reflector device for such vehicles which has a distinctive and unique reflecting pattern. It is a further object of the invention to provide a reflector device for the same which causes the vehicle to be shown up distinctly and dramatically in the headlights of a motor vehicle. It is a further object of the invention to provide a reflector device for bicycles which has a special and peculiar appeal to young people so that they will be induced to place the device on their bicycles. It is a further object of the invention to provide a reflector device for bicycles which is simple in construction, which is economical to manufacture, and which can easily and readily by applied to a bicycle. It is a further object of the invention to avoid the disadvantages of the prior art and to obtain such advantages as will appear as the description proceeds.

BRIEF DESCRIPTION OF THE INVENTION

The invention relates to a reflector device for a wheeled vehicle which comprises reflector means, reflector attaching means adapted for affixing the reflector means to a wheel of the vehicle intermediate the hub and the rim thereof whereby, when the reflector means is so attached and the wheel is rotated, the reflector moves in a circular path relative to the axle of the wheel; scanning means having a scan-aperture therein; and mounting means adapted to mount the scanning means on the vehicle in a position such that a scan-aperture in opposite said circular path. When the scanning means is attached to the wheeled vehicle and the wheel with the reflector means attached thereto is rotated, the reflector means rotates with the wheel past the scan-aperture with a periodicity and a pattern determined by the number and location of the scan-apertures and the number and location of the reflectors. Thus, when a reflector is opposite a scan-aperture, a light beam is reflected, but when it is opposite an imperforate or opaque portion of the scanning disc, there is no reflection, and a "peek-a-boo" or intermittent reflectance effect is obtained.

The term 'scan-aperture' is intended to mean any means through which light can pass to and from the reflectors. Thus, the scan-apertures include not only perforations in an otherwise opaque scanning means but, also, transparencies therein. Thus, the scanning means can be formed from an opaque sheet in which the scan-apertures are formed by perforations therein, or it can be be formed from a transparent sheet having an opaque over-printing, which may be partial or complete, but in any event, not in places where scan-apertures are desired. Such opaque over-printing is thus used to define the scan-apertures by leaving unimprinted transparent areas to constitute the scan-apertures. The latter is of particular advantage when it is desired to have the scan-apertures in the form of letters, preferably arranged in the form of words, e.g., names.

In a preferred form of the invention, a plurality of reflectors are affixed to a wheel in equi-distant positions, that is, at equal distances radially from the center, and at equal distances circumferentially. A like number of scan-apertures are provided and also arranged in the same equi-distant positions so that, when one reflector is exposed to a light beam, all the other reflectors are similarly exposed. If desired these reflectors may be of the same color or of different colors. It is desirable that the reflectors be of the daylight fluorescent-type so that, when the light beam of a vehicle impinges upon them, they will fluoresce in either one or a plurality of colors, depending on whether the discs are the same color or the several discs are of different colors. The reflectors also may be of a glass or plastic bead-type and these, too, can be uncolored or colored, as desired.

In accordance with another form of the invention, the scan-apertures can be arranged circumferentially in two sets, one set of which has a greater diameter than the other and with the scan-apertures in one set being staggered with reference to the other. With this arrangement, at least one reflector is affixed to the wheel opposite the scan-apertures and the reflection will have an in-and-out apparent motion as the reflection shifts from the inner set to the outer set and back, and so on.

If desired, the reflectors can be divided into two parts, one adapted to be scanned by the outer set of scan-apertures and the other adapted to be scanned by the inner set of scan-apertures, with the outer portion exposing the one color reflector and the inner set the other color. Also, successive reflectors can have the colors reversed or they can have an entirely different color combination, so that a wide variety of different effects can be obtained.

In accordance with another form of the invention, the scan-apertures may be elongated, advantageously, in an axial direction. Thus, when a similarly elongated reflector is affixed to the wheel opposite the scan-apertures, with its long axis at an angle to the long axis of the scan-aperture, rotation of the wheel cause successively higher or lower portions of the reflector to be intercepted by the scan-apertures. Thus, the top or the bottom of the reflector will reach a scan-aperture first, and successively lower or higher portions of the reflector will be exposed to the light beam as the rotation is continued. Thus, when the wheel is rotated in one direction, the effect will be that of the reflection starting at the outer portion of the elongated scan-aperture and progressing down toward the inner portion thereof, and when it is rotated in the opposite direction, or when the orientation is in the opposite direction, the opposite result will be obtained.

In accordance with another form of the invention, the scan-apertures can have an irregular shape, for example, that of segments of an annulus, which can be arranged regularly or irregularly about the scanning disc and, if desired, the reflectors can be formed of segments of an annulus such that they can be assembled into an annulus when mounted on the wheel. The different segments can be the same or different colors. In this case, as in all the cases, it is not necessary that the number of scan-apertures and the number of reflectors be the same, as one, two, or three reflectors, for example, can be scanned by four or more scan-apertures. Also, the number of reflectors can be greater than the number of scan-apertures.

Also, the scan-apertures need not be arranged in a symmetrical fashion, but can be arranged in a hit-and-miss or random fashion, or they can be arranged around the surface of a spiral, or in any other desired form.

In accordance with a preferred aspect of the invention, there is provided a scanning disc formed of weather-proof material having a central aperture adapted to fit the axle bolt of a bicycle and to be clamped between the fork and the hub of the axle when the axle bolt is drawn tight. Advantageously, this disc has scored push-outs between the central aperture and the circumference thereof which, when pushed out, leave the desired scan-apertures. Also, the push-outs are provided with integral means for attaching them to the spokes of the bicycle wheel so that they can be positioned to function as the reflectors. Advantageously, a reflectorized surface is provided by a reflectorized, adhesive-backed label of the same size and shape as the push-out. Preferably, a pressure-sensitive adhesive is used as the adhesive backing. Thus, in this modification, a kit can be made up of two such discs having, for example, four push-outs for each disc and eight such reflectorized labels. This provides a neat, flat package for marketing which can be converted into the desired scanning disc and reflectors by simply pushing out the push-outs, affixing the pressure-sensitive, reflectorized labels to the push-outs, either before or after they are pushed out, attaching the push-outs to the spoke of the wheel, and attaching the scanning disc to the axle bolt for clamping between the fork and the hub of the axle.

In the preferred form of this invention, the push-outs are circular and have diametrically opposed slits for attaching the discs to the spokes of the wheel. Advantageously, at the inner portion thereof, these slits have detents for engaging the spokes and helping to hold the push-outs thereon.

In one form of the invention, the affixing means for the reflectorized push-outs comprises diametrically opposed single slits having an enlarged portion at or near the radially inner end thereof formed by small apertures bridging the slits. These opposed slits can be snapped over a spoke and the enlarged portion will engage the spoke and thus hold the push-outs in place.

In accordance with another form of the invention, the push-out is provided with diametrically opposed parallel slits forming diametrically opposed tabs, which tabs are adapted to be inserted under the spokes and hold the reflectorized push-out in place. The terminal ends of said slits, advantageously, are curved, preferably outwardly, to form the desired detents to hold the push-outs in place.

In either of the above forms for attaching the push-outs to the spokes, the reflectorized labels can, advantageously, be applied after the push-outs are affixed to the spokes. When this is done, the labels provide means for adhesively affixing the push-outs to the spokes as they bridge the slits and effectively seal the open end portions thereof, so that the push-outs are fixedly locked on the spokes. This is especially of advantage when parallel, opposed slits are used because the tabs thus formed will adhere to the labels, thus locking the spokes firmly between the tabs and the adjacent portions of the push-outs.

It will be understood that the adhesive-backed, reflectorized labels can, in a like manner, be used to fix reflector bases to the spokes of a wheel independently, whether they are push-outs or not, and independently of their use with scanning discs. Thus, it may be desirable, in broader aspects of the invention, to make up a kit consisting essentially of an adhesive-backed, reflectorized label and a complementary backing material having slits in the opposite edges thereof, as above described, thereby providing a reflector which can be quickly and easily mounted on the wheels of a bicycle or like wheeled vehicle. It will be understood, however, that instead of being arranged at intervals of 90 degrees, they can be arranged at intervals of 360°/n, wherein n is the number of discs. It will also be understood that the discs, instead of being circular, can have other shapes.

The push-outs, instead of being circular, may be rectangular, and the same or equivalent-type attaching means may be provided. If these rectangular push-outs are elongated, they can have the attaching or affixing means adjacent each elongated end. If the slits penetrate from opposite sides to a point adjacent the long axis, then the push-out can be affixed to a single spoke with the long axis oriented radially, or one attaching means can be affixed to one spoke and the other to an adjacent spoke or a second adjacent spoke, as desired, to provide a mounting in which the long axis of the push-out reflector is canted to the radius.

In accordance with another form of the invention, the push-outs have the shape of the segments of an annulus which subtend an angle of 360°/n, wherein n is the number of segments and, preferably, at least four. When these push-outs are pushed out, they can then be reassembled in the shape of an annulus and the attaching means formed therein, so that they can be attached to the wheel in that form. Then, if each segment is of a different color, each colored portion will be scanned by the scan-apertures formed in the scanning disc by the push-outs. Advantageously, they are arranged symmetrically about the center of the scanning disc with the center of curvature of each segment away from the center of the scanning disc and on a radius thereof. It will be understood, however, that the center radius of any one or all the segments can be oriented at an angle to the radii of the disc, and that the orientation can be symmetrical or random.

BRIEF DESCRIPTION OF THE DRAWINGS

In the drawings

FIG. 1 is a partial view of a bicycle showing the reflector disc of the invention applied to the front wheel thereof.

FIG. 2 is an exploded view showing the application of the device of the invention to the front wheel of a bicycle.

FIG. 3 is a plan view of one form of the invention.

FIG. 4 is a fragmentary view showing the attachment of one form of reflector to the spokes of a bicycle wheel.

FIG. 5 is a view similar to that of FIG. 3 of another form of the invention.

FIG. 6 is a view similar to that of FIG. 3 of still another form of the invention.

FIG. 7 is a view of the reflectors obtained from the push-outs of FIG. 6.

FIG. 8 is a plan view of a modified form of the invention.

FIG. 9 is a partial view showing the mounting of reflectors adapted for use with the modification of FIG. 8.

FIG. 10 is a modified form of FIG. 8.

FIGS. 11 and 12 are modified forms of reflector assemblies.

DETAILED DESCRIPTION OF THE INVENTION

In FIG. 1 there is illustrated the front wheel of a bicycle having a frame 10, a fork 12, and a wheel 14. A more detailed construction of the wheel 14 is shown in FIG. 2. Mounted on the fixed axle of the wheel 14, between the wheel and the fork 12, is a scanning disc 16 having scan-apertures 18. The scanning disc can also be mounted on the outside of the fork. Affixed to the spokes of the wheel is one or more reflectors 20 in a position opposite the scan-apertures 18 so that, in the position shown in FIG. 1, the reflectorized surface of the reflector 20 is exposed through the aperture 18a in position to reflect the beam of light from the headlights of a vehicle. On the forward motion of the bicycle, the reflector 20 moves clockwise under the imperforate portion of the scanning disc 16 between scan-apertures 18a and 18b to a position where scanning disc 20 is exposed to scan-aperture 18b. This continues until the scanning disc 20 is repeatedly exposed to scan-apertures 18a, 18b, 18c, and 18d, in succession. Thus, in the operation of the bicycle, the scan-apertures 18 repeatedly scan the reflector 20 in a manner such that successively increasing incremental portions of the reflector 20 is exposed to the light beam, and then successively decreasing incremental portions thereof are so exposed. Then, all or a portion of the reflector 20 is occluded by the imperforate portion of the scanning disc 16 and the process is then repeated with the next scan-aperture.

While in FIGS. 1 and 2, there has been illustrated only one reflector, that is, only one on each side of the wheel or, may we say, one for each scanning disc, it will be understood that two or three or four or even more, can be used, as desired.

As seen in FIG. 2, the scanning disc 16 has a central aperture 22 of a size to fit snugly over the axle bolt 24. This makes it possible for the scanning disc 16 to be slipped over the axle bolt and to be clamped between the fork 12 and the axle hub 26 when the axle bolt is drawn tight. The scanning disc 16 is thus fixedly mounted opposite the wheel and the wheel is free to rotate relative thereto. The reflectors 20, as shown in FIG. 2, are affixed to the spokes of the wheel in a position such that the scan-apertures of the scanning disc will be opposite the path or loci of the reflectors, that is, opposite the path the reflectors take relative to the axle when the wheel is rotated.

As shown in FIG. 3, there is provided a scanning disc 16 having die-scored push-outs arranged between a central aperture 22, which may also be a die-scored push-out, and the periphery 30 of the disc. The die-scored push-outs 28 are arranged symmetrically about the scanning disc 16 at intervals of 90 degrees. Thus, the center of each push-out is arranged on the circumference of a circle concentric with the center of the scanning disc 16.

The push-outs 28 provided with slits 32 penetrating radially from diametrically opposite edges of the push-out. Adjacent the terminal end of the slits 32 is an aperture 34 which bridges the slit and forms a detent. Several of these detents can be provided by other apertures 36 and 38 bridging the slits. Thus, when the push-outs are pushed out, they can be affixed to the spokes by the means of these slits. Advantageously, the disc can bridge one spoke with one slit engaging the spoke on one side and the other slit engaging the spoke on the other side. The detents, 34, 36, and 38 help to hold the push-outs in engagement with the spokes.

At 40, FIG. 3, there is illustrated an adhesive-backed, reflectorized label. This is used to seal or lock the push-outs 28 to the spokes of the wheel and to provide a reflectorized surface therefor. A kit is made up, for example, two of the scanning discs 16, with the cut-scored push-outs therein and eight such adhesive-backed, reflectorized labels. In use, the push-outs are pushed out, affixed to the spokes as described, then covered with the adhesive-backed, reflectorized labels to seal them or lock them in place on the spokes and the scanning disc 16 with the scan-apertures formed therein by pushing out the push-outs 28 is affixed to the axle, as above described. Then, as the wheel is rotated, the reflectors formed by the push-outs or reflector bases 28 and the reflectorized, adhesive-backed label 40 are scanned by the scan-apertures 18, giving a "peek-a-boo" effect.

The reflectorized label 14 can be all the same color or can be of different colors, so that different colors successively flash through any one scan-aperture.

In the modification shown in FIG. 4, the push-outs 28 are provided on opposite edges with a pair of parallel slits forming tabs 42. These tabs engage under the spokes 44 and 46, as shown. In application, the disc 28 is started near the periphery of the wheel where the space between the spokes is wider and pushed in toward the center until the tabs 42 engage under the spokes 44 and 46 and then down to a position in which the loci of the disc 28 is opposite one or more scan-apertures.

In the modification shown in FIG. 4, the reflectorized surface is coated on the disc or push-out 28 and the disc is sealed in place by a complementary transparent, adhesive-backed label. It will be understood, however, that a reflectorized adhesive-back label can be used with this modification, as in the modification of FIG. 3.

In FIG. 4, the slits forming the tabs 42 curve outwardly at their terminal ends 48 to provide detents to hold the disc 28 more securely on the spokes.

In FIG. 5, the push-outs 28a are rectangular in shape with the long axis oriented on radii of the scanning disc 16. It will be understood, however, that the long axis can be canted to the radii, preferably, with all the push-outs 28a canted at the same angle and in the same direction.

Each of the push-outs 28a is provided with slits 50 and 52 penetrating from opposite long sides adjacent and parallel to opposite short sides of the rectangle to a point on or adjacent the long axis of the rectangle and terminate in apertures 54 and 56 which function as detents, as previously described.

The push-outs 28a are provided with reflectorized surfaces which may be formed as coatings or by the application of reflectorized, adhesive-backed labels, as previously described. Advantageously, two or more colors are used, so that different colored reflections will be obtained through any one scan-aperture as the wheel is rotated.

The push-outs 28a can be mounted on the spokes of the wheel in two different ways. Thus, they can be mounted with the slits 50 and 52 engaging the same spoke, in which case, the push-outs 28a will be oriented radially. Thus, the reflectorized surfaces will have the same size and the same orientation as the scan-apertures. If desired, however, one of the slits 50 or 52 can be attached to one spoke and the other to another spoke, so that the reflector will then be oriented at an angle to the radius. In this case, when the wheel is rotated, progressive parts of the reflector will be exposed through the scan-aperture as the wheel is rotated and the effect will be that of an apparent up and down motion of the reflected light beam.

In FIGS. 6 and 7 there is shown a modification in which the push-outs 28b are segments of an annulus. Each segment subtends an angle of 360°/n, wherein n is the number of segments so that, when the segments are pushed out and assembled, as shown in FIG. 7, they form an annulus. For practical purposes, more than three such push-outs are necessary if a complete annulus is to be obtained.

As shown in FIG. 6, the push-outs 28b are oriented symmetrically about the center aperture 22 with the center of the segments away from the aperture 22 or center of the scanning disc 16. It will be understood, however that they can be oriented in a different manner or a random manner, as long as at least some portion of the scan-aperture formed by the removal of the push-outs 28b are apposite the annulus of FIG. 7 when it is applied to the wheel.

In FIGS. 8 and 9 there is shown a modification in which push-outs 28c alternate with push-outs 28d in a staggered relation. Thus, the push-outs 28c are on a circumference of a larger circle than the push-outs 28d. These push-outs are then mounted on the spokes of a wheel, as shown in FIG. 9, in a position for one push-out to be scanned by the scan-apertures formed by pushing out push-outs 28c and the other by the scan-apertures formed by pushing out the push-outs 28d. As shown in FIG. 9, the different push-outs can be provided with different colored reflectorized surfaces and they can be arranged on the spokes in any order. That is, the push-outs 28c can be mounted opposite the scan-apertures formed by the push-outs 28d, if desired. The mounting of the push-outs is effected in the same manner as described in FIG. 5.

In FIGS. 10 and 11 there is shown a modification similar to that of FIGS. 8 and 9, in which a scanning disc 16 is provided with a plurality of staggered scan-apertures 58 and 60 adapted to scan an annular reflector as shown in FIG. 11. In this modification, the push-outs, if any, are not used as reflector bases, but a simpler annular reflector 62 is provided. If desired, the annular reflector 62 can have segments 64 of a different color. Also, if desired, the segments 64 can be separate reflectors adapted to be assembled when the reflectors are affixed to the spokes of the wheel. The mounting of the annular reflector 62 or the separate segments 64 can be effected in the way described in connection with FIGS. 3, 4, and 5. This applies also to the annulus of FIG. 7.

In FIG. 12 there is shown a reflector disc 66 which is made up of a base disc 68 having an aperture 70 large enough to fit over the hub of the wheel. At spaced points about the periphery are L-shaped slits 72 having a radial portion 74 and a circumferential portion 76. The latter terminates in an aperture 78 forming a spoke detent. The spacing of the radial slits 74 are such that, when one is apposite a spoke of the wheel, all the others are apposite a spoke of the wheel. Thus, the slits 74 can be pushed over the spokes until the slits 76 are engaged, the disc rotated until the spokes are lodged in the detents 78 and then the disc can have applied to the surface thereof pie-shaped or sector-shaped reflectorized, adhesive-backed labels, as shown, to give the multi-colored effect. This disc can be used with a scanning disc 16 of the character shown in FIGS. 1 and 2, 5 or 6. Also, it can be used for scanning discs having scan-apertures located on a spiral originating at the center of the disc.

It will thus be seen that there is provided a reflectorized device for bicycles which is simple and effective to apply, which has great attractiveness to young people, and which provides the effect of flashing lights, which will make the bicycle or other wheeled vehicle to which the device is applied, very conspicuous in the headlights of any approaching motor vehicle.

It is to be understood that the invention is not to be limited to the exact details of operation or structure shown and described, as obvious modifications and equivalents will be apparent to one skilled in the art.

I claim:

1. In a reflector device for a wheeled vehicle in which a wheel thereof rotates about a fixed axle bolt which is clamped to the frame of said vehicle which comprises
   reflector means having a reflecting surface;
   reflector-attaching means for affixing said reflector means to said wheel intermediate the hub and the rim thereof with at least a part of said reflecting surface oriented to reflect light beams which are transverse to the plane of said wheel, whereby, when the reflector means is so attached and the wheel is rotated, said reflector means moves in a circular path relative to the axle of said wheel, the combination therewith of scanning means comprised of opaque, sheet-form material having at least one scan-aperture therein and,
   mounting means operative when said axle bolt is clamped to said frame to fix said scanning means in a position such that a scan-aperture is opposite said circular path and such that transverse light beams can impinge on said reflecting surface only by passing through a scan-aperture.

2. The reflector device of claim 1, in which said reflector means comprises a scored push-out in said opaque, sheet-form material and in which said scan-aperture is the aperture formed when said push-out is removed.

3. The reflector device of claim 2, in which said scanning means has a plurality of scan-apertures and said reflector means has a complementary number of reflecting surfaces, one each for each scan-aperture.

4. The reflector device of claim 2, in which said push-out is circular.

5. The reflector device of claim 2, in which the push-out is rectangular.

6. The reflector device of claim 2, in which the push-out is arcuate.

7. The reflector device of claim 6, in which there is a plurality of arcuate push-outs, each of which subtends an angle equal to 360°/n, wherein n is the number of said push-outs and is greater than three (3), whereby the push-outs can be arranged in an annular arrangement about the common center and in which the means for attaching them to said wheel preserves this annular arrangement.

8. A wheeled vehicle having applied thereto the reflector device of claim 2.

9. The reflector device of claim 1, in which said reflector means comprises a reflector having the same configuration as said scan-aperture.

10. The reflector device of claim 1, in which said scanning means has a plurality of scan-apertures and said reflector means has a complementary number of reflecting surfaces, one each for each scan-aperture.

11. The reflector device of claim 1, in which said scan-aperture is rectangular, in which said reflector means comprises a rectangular reflector, and in which the means attaching said reflector means to said wheel causes said rectangular reflector to be disposed with its long axis at an angle to the long axis of the scan-aperture.

12. The reflector device of claim 11, in which the long axis of the scan-aperture is radially disposed.

13. The reflector device of claim 1, in which said reflector means is comprised of sheet-form material and said reflector-attaching means comprises a spoke-engaging slit in an edge of the sheet-form material of said reflector means.

14. The reflector device of claim 13, in which said slit has at least one spoke-receiving detent.

15. The reflector device of claim 14, in which said detents comprise small apertures bridging said slits.

16. The reflector device of claim 14, in which said detents comprise an arcuate portion at the terminal end of said slits.

17. The reflector device of claim 13, in which said reflector-attaching means comprises a pair of slits which extend inwardly from opposite edges to form spoke-engaging tabs on said opposite edges.

18. The reflector device of claim 1, in which said reflector comprises an adhesive-backed, reflectorized label and a complementary backing member therefor of sheet-form material having at least one spoke-engaging slit and in which said adhesive-backed label is adapted to be applied to said backing member after it has been mounted on said wheel with a spoke thereof disposed in said slit and with said label bridging said slit and sealing therein the spoke engaged thereby.

19. The reflector device of claim 18, in which said slit has at least one spoke-receiving detent.

20. The reflector device of claim 19, in which said detents comprise small apertures bridging said slits.

21. The reflector device of claim 19, in which said detents comprise arcuated portions at the terminal end of said slits.

22. A wheeled vehicle having applied thereto the reflector device of claim 18.

23. The reflector device of claim 18, in which said reflector-attaching means comprises a pair of slits which extend inwardly from opposite edges to form spoke-engaging tabs on said opposite edges.

24. The reflector device of claim 1, consisting in a package which comprises a weather-proof disc of opaque, sheet-form material having a central aperture adapted snugly to fit the axle bolt of a bicycle and to be clamped to the frame of the vehicle when said axle bolt is drawn tight, said disc having at least one scored push-out between said central aperture and the circumference of said disc which, when pushed out, leaves a scan-aperture and said push-out having integral means for attaching it to a spoke of a bicycle wheel, and a reflectorized, adhesive-backed label for each said scored push-out which is complementary in size and shape therewith.

25. A reflector device according to claim 24, in which said integral means comprises spoke-engaging slits in opposite edges of said push-out, said label functioning to seal the spokes in said slits.

26. The reflector device of claim 25, in which each of said slits has at least one spoke-receiving detent.

27. The reflector device of claim 25, in which said push-outs are circular and said slits ae diametrically opposed.

28. The reflector device of claim 25, in which said slits comprise a pair of slits on opposite edges which form spoke-engaging tabs on said opposite edges.

29. A reflector device of claim 28, in which said push-outs are circular and said tabs are diametrically opposed.

30. A reflector device of claim 24, in which said push-outs are rectangular.

31. A reflector device of claim 24, in which said push-outs are arcuate segments of an annulus.

32. A wheeled vehicle having applied thereto the reflector device of claim 1.

33. The reflector device of claim 1, in which the scanning means comprises a transparency having an opaque over-printing except for portions forming the scan-apertures.

34. The reflector device of claim 33, in which the scan-apertures comprise letters arranged to form words.

* * * * *

UNITED STATES PATENT AND TRADEMARK OFFICE
CERTIFICATE OF CORRECTION

PATENT NO. : 4,209,230

DATED : June 24, 1980

INVENTOR(S) : John A. Perkins

It is certified that error appears in the above–identified patent and that said Letters Patent are hereby corrected as shown below:

Col. 1, line 35; "by" should read -- be --
Col. 1, line 52; "in" should read -- is --
Col. 2, line 19; "desired these" should read -- desired, these --
Col. 2, line 52; "wheel cause" should read -- wheel will cause --
Col. 4, line 56; "drawings" should read -- drawings: --
Col. 5, line 63; "outs arranged" should read -- outs 28 arranged --
Col. 6, line 3; "28 provided" should read -- 28 are provided --

Signed and Sealed this

Eighteenth Day of November 1980

[SEAL]

Attest:

SIDNEY A. DIAMOND

Attesting Officer

Commissioner of Patents and Trademarks